(12) United States Patent
Tang

(10) Patent No.: US 11,039,471 B2
(45) Date of Patent: Jun. 15, 2021

(54) METHOD AND DEVICE FOR RANDOM ACCESS

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 117 days.

(21) Appl. No.: 16/469,263

(22) PCT Filed: Dec. 16, 2016

(86) PCT No.: PCT/CN2016/110537
§ 371 (c)(1),
(2) Date: Jun. 13, 2019

(87) PCT Pub. No.: WO2018/107499
PCT Pub. Date: Jun. 21, 2018

(65) Prior Publication Data
US 2020/0107359 A1 Apr. 2, 2020

(51) Int. Cl.
*G01R 31/08* (2020.01)
*H04J 1/16* (2006.01)
(Continued)

(52) U.S. Cl.
CPC ....... *H04W 74/008* (2013.01); *H04W 72/044* (2013.01); *H04W 74/004* (2013.01); *H04W 74/0833* (2013.01); *H04W 76/18* (2018.02)

(58) Field of Classification Search
CPC . H04W 74/008; H04W 76/18; H04W 72/044; H04W 74/004; H04W 74/0833
See application file for complete search history.

(56) References Cited

U.S. PATENT DOCUMENTS 10,306,482 B2 * 5/2019 Hwang ............... H04W 4/70
2010/0238859 A1 * 9/2010 Vukovic ........... H04W 74/0833
370/328
(Continued)

FOREIGN PATENT DOCUMENTS

CN 102917433 2/2013
CN 104704884 6/2015
(Continued)

OTHER PUBLICATIONS

ZTE ("beamforming Random Access in NR", R1-166419) (Year: 2016).*
Fujitsu, "Discussion on RAR in NR considering reciprocity issues," 3GPP TSG RAN WG1 Meeting #87, R1-1611462, Nov. 2016, 6 pages.
LG Electronics, "RACH Procedure Considering Multi-TRP Operation," 3GPP TSG RAN WG1 Meeting #87, R1-1613120, Nov. 2016, 5 pages.
(Continued)

*Primary Examiner* — Maharishi V Khirodhar
(74) *Attorney, Agent, or Firm* — Hodgson Russ LLP

(57) ABSTRACT

A method for random access includes: continuously transmitting, by a terminal device, at least one random access signal to a network device; detecting, by the terminal device, a random access response transmitted by the network device in a random access response window corresponding to continuous transmissions in multiple times of random access signals, wherein the continuous transmissions in multiple times of the random access signals comprise continuous transmission of the at least one random access signal; continuing to transmit, by the terminal device, a subsequent random access signal to the network device if the terminal device fails to detect the random access response transmitted by the network device before ending of the random access response window.

16 Claims, 4 Drawing Sheets

100

Terminal Device Continously Transmits at Least One Random Access Signal In Multiple Times to Network Device — S110

Terminal Device Detects Random Access Response Transmitted by Network Device in Random Access Response Window Corresponding to Continous Transmissions in Multiple Times of Random Access Signals, Wherein Continous Transmissions in Multiple Times of Random Access Signals Include Continous Transmission of at Least One Random Access Signal — S120

Terminal Device Continues to Transmit Subsequent Random Access Signal to Network Device If Terminal Device Failed to Detect Random Access Response Transmitted by Network Device Before Ending of Random Access Response Window — S130

(51) Int. Cl.
  *H04L 1/00* (2006.01)
  *H04W 74/00* (2009.01)
  *H04W 76/18* (2018.01)
  *H04W 72/04* (2009.01)
  *H04W 74/08* (2009.01)

(56) References Cited

U.S. PATENT DOCUMENTS

| | | | |
|---|---|---|---|
| 2015/0036622 A1* | 2/2015 | Yang | H04W 74/0833 370/329 |
| 2015/0078286 A1* | 3/2015 | Kim | H04B 7/26 370/329 |
| 2015/0117374 A1 | 4/2015 | Wu | |
| 2016/0219626 A1 | 7/2016 | Martin | |
| 2016/0302080 A1 | 10/2016 | Hwang et al. | |
| 2019/0104549 A1* | 4/2019 | Deng | H04B 7/0617 |

FOREIGN PATENT DOCUMENTS

| | | |
|---|---|---|
| CN | 105594285 | 5/2016 |
| CN | 105794297 | 7/2016 |
| CN | 105992328 | 10/2016 |
| RU | 2417560 | 4/2011 |
| WO | 2014181646 | 11/2014 |
| WO | 2016049840 | 4/2016 |
| WO | 2016119237 | 8/2016 |

OTHER PUBLICATIONS

Nokia et al., "Impact of UE TX/RX Beam correspondence and non-correspondence," 3GPP TSG-RAN WG1#87, R1-1612298, Nov. 2016, 6 pages.
Samsung, "Discussion on random access procedure for eLAA," 3GPP TSG RAN WG1 Meeting #85, R1-164749, May 2016, 4 pages.
EPO, Office Action for EP Application No. 16924194.0, dated Nov. 6, 2019.
ISDEC, Office Action for CA Application No. 3046573, dated Jul. 9, 2020.
SIPO, First Office Action for CN Application No. 201680091101.1, dated Jun. 1, 2020.
SIPO, Second Office Action for CN Application No. 201680091101.1, dated Aug. 17, 2020.
FSIP, Office Action for RU Application No. 2019121556-07, dated Jun. 3, 2020.
WIPO, ISR for PCT/CN2016/110537, Jun. 7, 2017.
IPIN, First Office Action for IN Application No. 201917027354, dated Sep. 20, 2020.
INPI, First Office Action for BR Application No. 112019011710-5, dated Sep. 16, 2020.

\* cited by examiner

FIG. 4
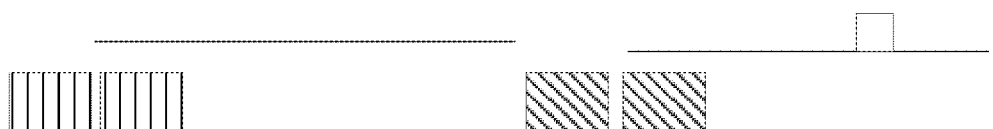
FIG. 5
FIG. 6
FIG. 7
FIG. 8
FIG. 9
FIG. 10
FIG. 11

METHOD AND DEVICE FOR RANDOM ACCESS

CROSS-REFERENCE TO RELATED APPLICATION

This application is a U.S. national phase application of International Application No. PCT/CN2016/110537, filed Dec. 16, 2016, the entire disclosure of which is incorporated herein by reference.

TECHNICAL FIELD

The present application relates to the field of communication, and more particularly, to a method and a device for random access in the field of communication.

BACKGROUND

In a future network system, different beams correspond to different directions and different coverage areas. In the process of random access to the network of a terminal device, the beams of the terminal device and of the network device may not be well matched, which results in failed random access, and thus the terminal device needs to retransmit the random access signal to the network device. In the existing communication system, if the terminal device transmits a random access signal, for example a preamble, to the network device for the first time, and did not receive a random access response of the random access signal transmitted by the network device during the random access response window of the random access signal, the terminal device will transmit the random access signal to the network device again, which will increase the delay of random access. Therefore, how to reduce the delay of random access of a terminal device is an urgent problem to be solved.

SUMMARY

The present application provides a method and a device for random access.

In a first aspect, there is provided a method for random access, comprising: continuously transmitting, by a terminal device, at least one random access signal to a network device; detecting, by the terminal device, a random access response transmitted by the network device in a random access response window corresponding to continuous transmissions in multiple times of random access signals, wherein the continuous transmissions in multiple times of the random access signals comprise continuous transmission of the at least one random access signal; continuing to transmit, by the terminal device, a subsequent random access signal to the network device if the terminal device fails to detect the random access response transmitted by the network device at the end of the random access response window.

In a second aspect, there is provided a method for random access including: continuously transmitting, by a terminal device, random access signals to a network device in multiple times; detecting, by the terminal device, a random access response transmitted by the network device in a plurality of random access response windows corresponding to continuous transmissions in multiple times of the random access signals, wherein one transmission of that of the random access signals transmitted in multiple times is corresponding to one of the plurality of random access response windows, the continuous transmissions in multiple times of the random access signals include transmissions in multiple times of the random access signals; continuing to transmit, by the terminal device, a subsequent random access signal to the network device if the terminal device fails to detect the random access response transmitted by the network device within the plurality of random access response windows.

In a third aspect, a device for random access is provided for performing a method in the first aspect or any of possible implementations thereof. Specifically, the device includes units for performing a method in the first aspect or any of the possible implementations thereof.

In a fourth aspect, a device for random access is provided for performing a method in the second aspect or any of possible implementations thereof. Specifically, the device includes units for performing a method in the second aspect or any of the possible implementations thereof.

In a fifth aspect, there is provided a device for random access including a transceiver and a processor, wherein the terminal device may perform a method in the first aspect or any of the possible implementations thereof.

In a sixth aspect, there is provided a device for random access including a transceiver and a processor, wherein the terminal device may perform a method in the second aspect or any of the possible implementations thereof.

In a seventh aspect, there is provided a computer-readable medium used for storing a program code to be performed by a terminal device, wherein the program code comprises instructions for performing methods in the first aspect or possible implementations thereof.

In an eighth aspect, there is provided a computer-readable medium used for storing a program code to be performed by a network device, wherein the program code comprises instructions for performing methods in the second aspect or possible implementations thereof.

BRIEF DESCRIPTION OF THE DRAWINGS

FIG. 4 is a schematic block diagram of a method for random access according to another embodiment of the present application.

FIG. 5 is a schematic block diagram of a method for random access according to another embodiment of the present application.

FIG. 6 is a schematic block diagram of a method for random access according to another embodiment of the present application.

FIG. 7 is a schematic block diagram of a method for random access according to another embodiment of the present application.

FIG. 8 is a schematic block diagram of a method for random access according to another embodiment of the present application.

FIG. 9 is a schematic block diagram of a method for random access according to another embodiment of the present application.

FIG. 10 is a schematic block diagram of a method for random access according to another embodiment of the present application.

FIG. 11 is a schematic block diagram of a method for random access according to another embodiment of the present application.

DETAILED DESCRIPTION

It should be understood that embodiments of the present application can be applied in various kinds of communication systems such as Global System of Mobile (GSM) communication system, Code Division Multiple Access (CDMA) system, Wideband Code Division Multiple Access (WCDMA) system, General Packet Radio Service (GPRS), Long Term Evolution (LTE) system, LTE Frequency Division Duplex (FDD) system, LTE Time Division Duplex (TDD), Universal Mobile Telecommunication System (UMTS), Worldwide Interoperability for Microwave Access (WiMAX) communication system or a future 5G system, and so on.

It should also be understood that, in embodiments of the present application, a terminal device may be referred to as a user equipment (referred to as "UE"), a terminal device, a mobile station (referred to as "MS"), a mobile terminal or a terminal device in a future 5G network, etc. The terminal device can communicate with one or more core networks via a Radio Access Network (referred to as "RAN"). For example, the terminal can be a mobile phone (or referred to as a "cellular" telephone) or a computer with a mobile terminal, etc. For example, the terminal can also be a mobile device which is portable, pocket-sized, handheld, built in a computer or in a vehicle and exchanges voice and/or data with the wireless access network.

A network device can be used to communicate with the mobile device, and the network device can be a base transceiver station (referred to as "BTS") in the Global System of Mobile communication (referred to as "GSM") or Code Division Multiple Access (referred to as "CDMA"), may also be a NodeB (referred to as "NB") in Wideband Code Division Multiple Access (referred to as "WCDMA"), or an evolutional Node B in LTE (referred to as "eNB" or "eNodeB", or a relay station or access point, or an in-vehicle device, a wearable device, and an access network device in a future 5G network.

In embodiments of the present application, the random access signal that the terminal device can transmit to the network device may be a preamble. For example, a random access signal may be transmitted on a physical random access channel (referred to as "PRACH"). After the network device receives the random access signal transmitted by the terminal device, the network device may transmit a random access response (RAR) to the terminal device, wherein the random access response is used to notify the terminal device of the successful access.

Figure 1:
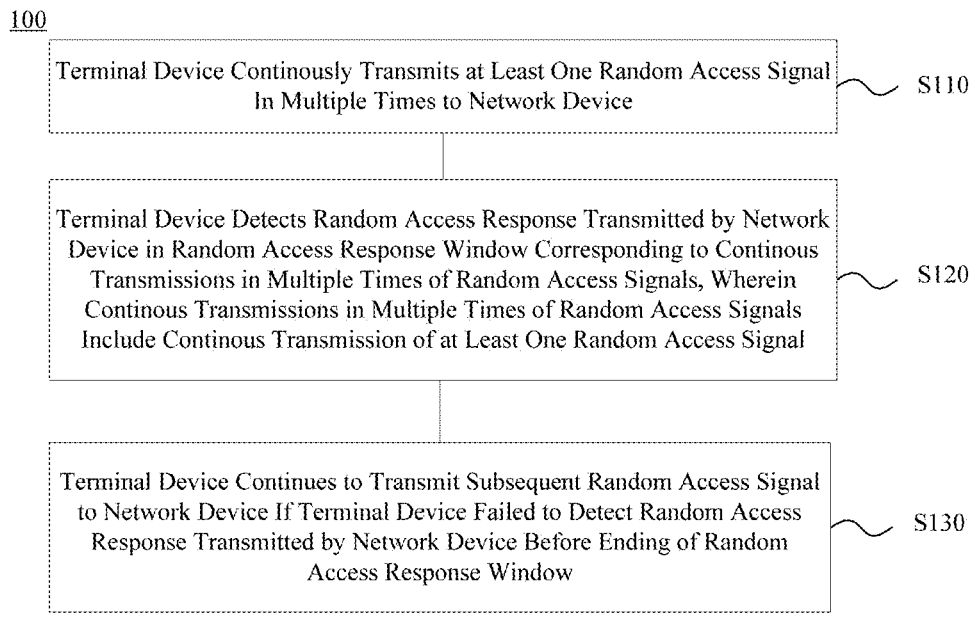
FIG. 1 is a schematic diagram of a method for random access according to an embodiment of the present application.

FIG. 1 is a schematic diagram of a method 100 for random access according to an embodiment of the present application. FIG. 1 shows steps or operations of the method for random access provided in an embodiment of the present application. These steps or operations, however, are merely examples, and embodiments of the present application can also perform other operations or modifications of individual operations in FIG. 1. The method 100 includes processes as follows.

At S110, the terminal device continuously transmits at least one random access signal to the network device.

It should be understood that, the at least one random access signal continuously transmitted represents the random access signals transmitted before the random access response is received, i.e., embodiments of the present application does not have any limit on whether the continuous transmissions are continuous on the resources. Transmitting at least one random access signal on time-frequency resources with specific intervals before the random access response is received can also be called as continuously transmitting at least one random access signal. Similarly, in the embodiment of the present application, the continuous transmitting of the multiple times of random access signals represents the random access signal transmitted before the random access response is received, that is, the embodiment of the present application does not limit whether the continuous transmitting is on a specific resource.

It also should be understood that, transmitting a random access signal once may be transmitting one random access signal, or transmitting a set of random access signals, which is not limited in embodiments of the present application.

Optionally, S110 includes: continuously transmitting, by the terminal device, the at least one random access signal to the network device on a same beam (for example, the first two large blocks of the same shape shown in FIG. 3, FIG. 4, FIG. 5 and FIG. 6 represent transmitting the random access signal twice on the same beam); or continuously transmitting, by the terminal device, the at least one random access signal to the network device on different beams (for example, the first two large blocks of the different shapes shown in FIG. 7, FIG. 8, FIG. 9 and FIG. 10 represent transmitting the random access signal in two times on different beams).

Optionally, continuously transmitting, by the terminal, the at least one random access signal to the network device on different beams includes: transmitting, by the terminal device, a first part of random access signals of the at least one random access signal to the network device on a first beam; transmitting, by the terminal device, a second part of random access signals of the at least one random access signal to the network device on a second beam (for example, the first two large blocks in vertical lines in FIGS. 9 and 10 represent the first beam on which random access signals are transmitted in two times, and the third and fourth large blocks in oblique lines in FIGS. 9 and 10 represent the second beam on which random access signals are transmitted in two times), wherein the first beam is different from the second beam, and the first part of random access signals is different from the second part of random access signals. The term "different" here can be understood as being transmitted to the network device at different times.

At S120, the terminal device detects a random access response transmitted by the network device in a random access response window corresponding to continuous transmissions in multiple times of random access signals, wherein the continuous transmissions in multiple times of the random access signals comprise continuous transmission of the at least one random access signal.

It should be understood that, the random access signals transmitted in multiple times may be identical random access signals. For example, the beams on which the random access signals are transmitted are the same, and the random access signals transmitted in multiple times adopt the same coding mode; The random access signals transmitted in multiple times can also be different random access signals. For example, random access signals transmitted in multiple times on different beams may be called as different random access signals, and random access signals transmitted in multiple times in different coding mode may be called as different random access signals. Certainly, the random access signals transmitted in multiple times can be identical to or different from the subsequent random access signals. Embodiments of the present application do not limit this.

Optionally, S120 may include: starting, by the terminal device, the random access response window after the continuous transmissions in multiple times of the random access signals are completed by the terminal device (for example, the positions where the horizontal lines start in FIG. 3, FIG. 4, FIG. 7, and FIG. 9 represent the time at which the random access response window is started. The positions where the horizontal lines start in FIG. 3, FIG. 4, FIG. 7, and FIG. 9 are after the blocks, that is, the random access response window is started after the transmissions in multiple times of the random access signals have been completed), and detecting, by the terminal device, the random access response transmitted by the network device in the random access response window. Starting the random access response window by the terminal device includes: starting, by the terminal device, the random access response window and detecting, by the terminal device, the random access response transmitted by the network device in the random access response window during a specific period after the continuous transmissions in multiple times of the random access signals are completed by the terminal device, wherein the specific period can be configured by the network and/or specified in a protocol; or starting the random access response window after the continuous transmissions in multiple times of the random access signals are completed by the terminal device.

Optionally, S120 may further include: starting, by the terminal device, the random access response window and detecting, by the terminal device, the random access response transmitted by the network device in the random access response window, if transmission of a first random access signal of the at least one random access signal is completed by the terminal device (for example, the positions where the horizontal lines start in FIG. 5, FIG. 6, FIG. 8, and FIG. 10 represent the time at which the random access response window is started, the positions where the horizontal lines start in FIG. 5, FIG. 6, FIG. 8 and FIG. 10 are after the first blocks, that is, the random access signal window is started just after the first transmission of a random access signal is completed). The first random access signal may be a random access signal of the at least one random access signal, which is transmitted in the first time, or transmitted in the second time; optionally, if the RAR window for each transmission of a random access signal is the same, then the first random access signal may be the random access signal that is transmitted in the first time; if the RAR window for each transmission of a random access signal is different, then the first random access signal is the random access signal for which the RAR window ends earliest.

At S130, the terminal device continues to transmit the subsequent random access signal to the network device if the terminal device fails to detect the random access response transmitted by the network device at the end of the random access response window.

Figure 3:
FIG. 3 is a schematic block diagram of a method for random access according to another embodiment of the present application.

As an alternative embodiment, S130 includes: continuing to transmit, by the terminal device, the subsequent random access signal to the network device on a beam on which the at least one random access signal is transmitted (for example, large blocks in the latter part in FIG. 4, FIG. 6, FIG. 7, FIG. 8, and FIG. 10 represent the subsequent random access signals transmitted, and the shapes of the large blocks in the latter part are consistent with those of the previous large blocks, which means that the same beam is used to transmit the subsequent random access signals); or continuing to transmit, by the terminal device, the subsequent random access signal to the network device on a beam other than that beam on which the at least one random access signal is transmitted (for example, the shapes of the large blocks in the latter part in FIG. 3 and FIG. 5 are inconsistent, which means that different random beams are used to transmit the subsequent random access signals).

As an alternative embodiment, the method 100 further includes: stopping transmitting, by the terminal device, the subsequent random access signal to the network device if the random access response transmitted by the network device is detected in the random access response window by the terminal device.

As an alternative embodiment, stopping transmitting, by the terminal device, the subsequent random access signal to the network device if the random access response transmitted by the network device is detected in the random access response window by the terminal device includes: stopping transmitting, by the terminal device, a random access signal, which is not transmitted, of the random access signals which should be transmitted in multiple times and the subsequent random access signal to the network device when the random access response transmitted by the network device is detected by the terminal device before ending of the random access response window.

Specifically, the network device may configure the terminal device to transmit random access signals in multiple times so that if part of random access signals of the random access signals which should be transmitted in multiple times has been transmitted by the terminal device when the RAR is detected by the terminal device in the RAR window of the random access signals transmitted in multiple times, the terminal device does not need to transmit the random access signal that is not transmitted of the random access signals which should be transmitted in multiple times to the network device. As such, the signaling overhead can be reduced while reducing the delay of random access. For example, in FIG. 9, after transmitting the first random access signal by the terminal device, the terminal device may start a random access response window after a specific time period to detect whether a random access response transmitted by the network device is received. Assuming that the network device specifies that the random access response window is a common random access response window shared by four random access signals, it is possible that the terminal device receives the random access signal response transmitted by the network device after transmitting the second random access signal, then the terminal device may stop transmitting the remaining two random access signals to the network device.

Figure 2:
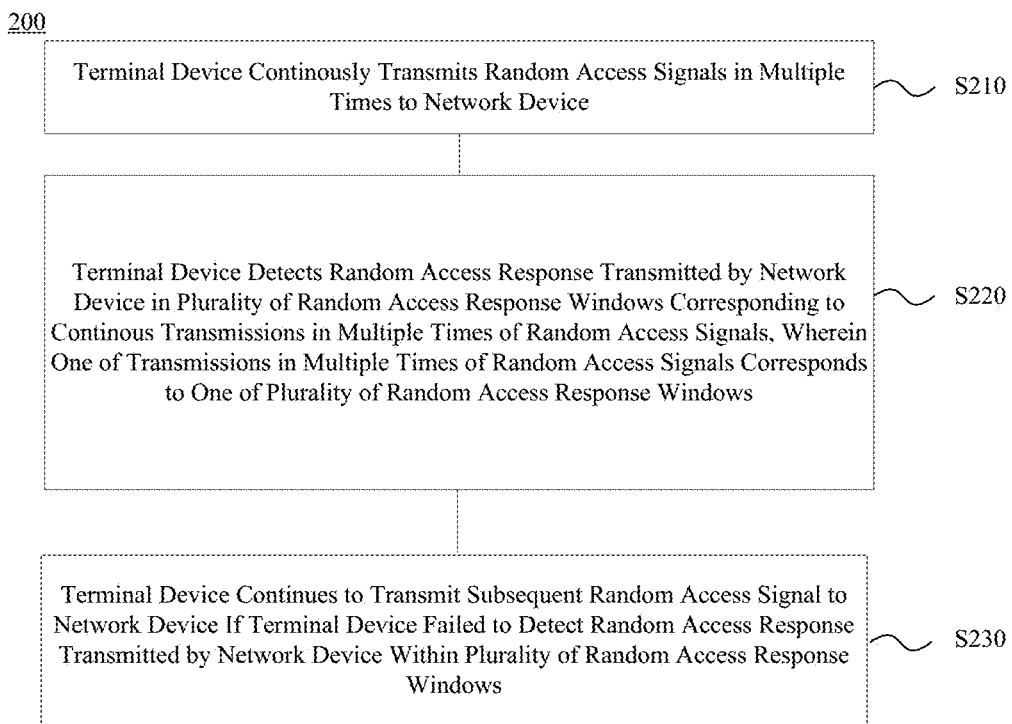
FIG. 2 is a schematic diagram of a method for random access according to another embodiment of the present application.

FIG. 2 is a schematic diagram of a method 200 for random access according to an embodiment of the present application. FIG. 2 shows steps or operations of the method for random access provided in an embodiment of the present application. These steps or operations, however, are merely examples, and embodiments of the present application can also perform other operations or modifications of individual operations in FIG. 2. The method 200 includes processes as follows.

At S210, the terminal device continuously transmits random access signals to the network device in multiple times.

Figure 12:
FIG. 12 is a schematic block diagram of a method for random access according to another embodiment of the present application.
Figure 13:
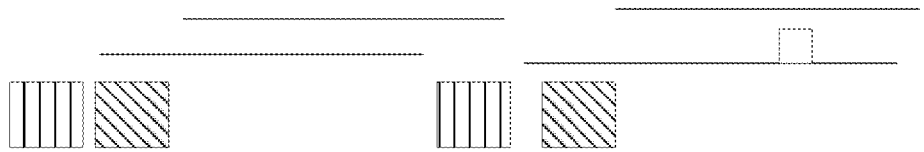
FIG. 13 is a schematic block diagram of a method for random access according to another embodiment of the present application.
Figure 14:
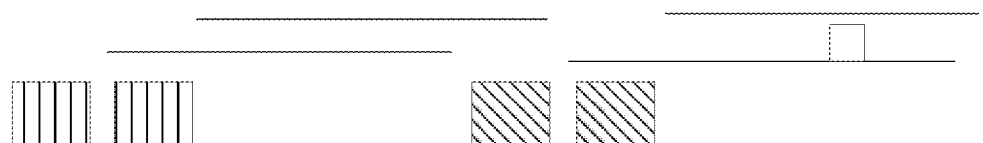
FIG. 14 is a schematic block diagram of a method for random access according to another embodiment of the present application.

Optionally, S210 includes: continuously transmitting, by the terminal device, the random access signals to the network device on a same beam in multiple times (for example, the first two large blocks of the same shape shown in FIG. 12 and FIG. 14 represent that the random access signals are transmitted in two times on the same beam); or continuously transmitting, by the terminal device, the random access signals to the network device in multiple times on different beams (for example, the first two large blocks of different shapes shown in FIG. 11 and FIG. 13 represent that the random access signals are transmitted in two times on different beams).

Figure 15:
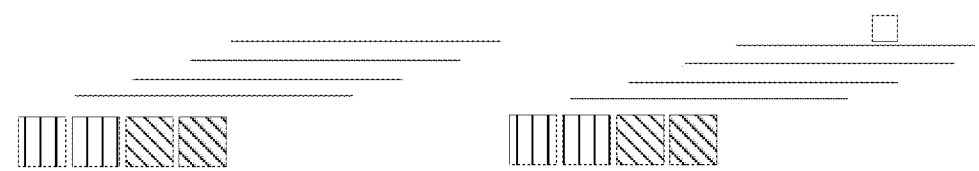
FIG. 15 is a schematic block diagram of a method for random access according to another embodiment of the present application.
Figure 16:
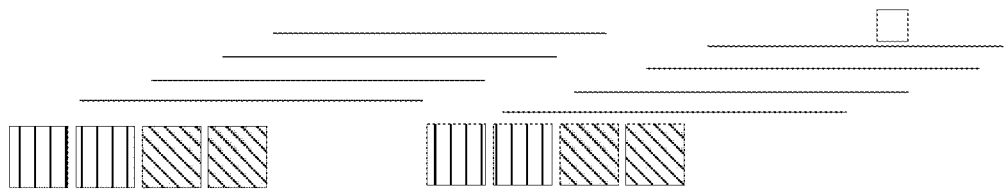
FIG. 16 is a schematic block diagram of a method for random access according to another embodiment of the present application.

Optionally, continuously transmitting, by the terminal device, the random access signals to the network device in multiple times on different beams includes: continuously transmitting, by the terminal device, a first part of random access signals of the random access signals to the network device on a first beam; continuously transmitting, by the terminal device, a second part of random access signals of the random access signals to the network device on a second beam, wherein the first beam is different from the second beam (for example, the first two large blocks in vertical lines in FIGS. 15 and 16 represent the first beam on which random access signals are transmitted in two times, and the third and fourth large blocks in oblique lines in FIGS. 15 and 16 represent the second beam on which random access signals are transmitted in two times).

At S220, detecting, by the terminal device, a random access response transmitted by the network device in a plurality of random access response windows corresponding to continuous transmissions in multiple times of the random access signals, wherein one transmission of that of the random access signals transmitted in multiple times is corresponding to one of the plurality of random access response windows.

Optionally, S220 includes: starting, by the terminal device, a random access response window corresponding to each of transmissions of the random access signals when the each transmission is completed by the terminal device, and detecting, by the terminal device, the random access response transmitted by the network device in the plurality of random access response windows (for example, the positions where the horizontal line starts in FIG. 11 to FIG. 16 represent the time when the random access response window is started, each of the positions where the horizontal line starts in FIG. 11 to FIG. 16 is after each block, that is, the random access response window corresponding to each transmission of the random access signal is started when the each transmission of the random access signal has been completed).

At S230, the terminal device continues to transmit a subsequent random access signal to the network device if the terminal device fails to detect the random access response transmitted by the network device in the plurality of random access response windows.

It should be understood that, continuing to transmit, by the terminal device, a subsequent random access signal to the network device can be: continuing to transmit, by the terminal device, the subsequent random access signal to the network device during a specific period after the terminal device fails to detect the random access response transmitted by the network device in the plurality of random access response windows, wherein the specific period here can be configured by the network and/or specified in a protocol and embodiments of the present application have no limits on this; continuing to transmit, by the terminal device, a subsequent random access signal to the network device can also be: continuing to transmit, by the terminal device, the subsequent random access signal to the network device if the terminal device fails to detect the random access response transmitted by the network device at the ends of the plurality of random access response windows.

Optionally, S230 includes: continuing to transmit, by the terminal device, the subsequent random access signal to the network device on a beam on which the random access signals are transmitted (for example, large blocks in the latter part in FIG. 11, FIG. 13, FIG. 15 and FIG. 16 represent a subsequent random access signal transmitted, and the shape of the large blocks in the latter part is consistent with that of the previous large blocks, which means that the same beam is used to transmit the subsequent random access signal); or continuing to transmit, by the terminal device, the subsequent random access signal to the network device on a beam other than that beam on which the random access signals are transmitted. (for example, the shapes of the large blocks in the latter part in FIG. 12 and FIG. 14 are inconsistent, which means that different random beams are used to transmit the subsequent random access signals).

It should be understood, continuously transmitting, by the terminal device, the random access signals to the network device on different beams in multiple times, for example, the terminal device continuously transmits the random access signals to the network device on different beams in multiple times, can be that the terminal device continuously transmits the random access signals to the network device on different beams in multiple times. In embodiments of the present application, the beams used for transmitting the random access signals in multiple times may be same or different. That is, the beam for each transmission of the transmissions in multiple times of the random access signals is identical, or the beams respectively for at least two of the transmissions in multiple times of the random access signals are different.

Optionally, at S230, the terminal device continues to transmit the subsequent random access signal to the network device if the terminal device fails to detect the random access response transmitted by the network device before ending of each of the plurality of random access response windows. For example, in FIG. 11, FIG. 12 and FIG. 15, the end of each horizontal line represents the end of the random response window, and the large blocks in the latter part represent that the subsequent random access signal is retransmitted, and the subsequent random access signal is transmitted after all the horizontal lines in FIG. 11, FIG. 12 and FIG. 15 end, which means that the terminal device continues to transmit the subsequent random access signal to the network device when the random access response is not detected at the ends of all the windows.

Optionally, S230 includes: continuing to transmit, by the terminal device, the subsequent random access signal to the network device if the terminal device fails to detect the random access response transmitted by the network device before ending of any one of the plurality of random access response windows.

Optionally, the method 200 further includes: stopping transmitting, by the terminal device, the subsequent random access signal to the network device if the random access response transmitted by the network device is detected in the plurality of random access response windows by the terminal device.

Optionally, the terminal device stops transmitting a random access signal, which is not transmitted, of the random access signals which should be transmitted in multiple times and the subsequent random access signal to the network device when the random access response transmitted by the network device is detected by the terminal device in any one of the plurality of random access response windows.

For example, it can be configured by the network and/or prescribed in a protocol that the terminal device transmits N random access signals which correspond to N random access response windows, and if the terminal device has transmitted N−2 random access signals when the random access response transmitted by the network device is detected by the terminal device in any one of the random access response windows, then the terminal device does not need to transmit the remaining two random access signals to the network device. That is, the random access response is detected in only the N−2 random access response windows, that is, as long as a plurality of random access response windows are started, detections can be made in parallel in these windows, and whenever the random access response is detected, the remaining random access signals are stopped from being transmitted to the network device.

As an example, in FIGS. 11, 12 and 15, the end of each horizontal line represents the end of the random response window, and the large blocks in the latter part represent that the subsequent random access signal is retransmitted. In FIGS. 13, 14 and 16, the subsequent random access signal is transmitted immediately after the end of the lowermost horizontal line. The horizontal lines from bottom to top respectively indicate the random access response window of the first random access signal, the random access response window of the second random access signal, the random access response window of the third random access signal and the random access response window of the fourth random access signal. If no random access response is detected in any one of the random access response window of the second random access signal, the random access response window of the third random access signal and the random access response window of the fourth random access signal when the lowermost horizontal line ends, the terminal device continues to transmitting a subsequent random access signal to the network device. As another example, in a case that the random access response window of the first random access signal ends and the second random access signal has been transmitted, if the random access response is detected in the random access response window of the second random access signal and at this time the third and fourth random access signals have not been transmitted, which means that there are no random access response windows of the third and fourth random access signals, then the terminal device stops to transmit the third and fourth random access signals to the network device.

Twelve methods for random accesses provided by embodiments of the present application are described below with reference to FIGS. 3 to 16. In each of the figures, a large block represents a beam, a horizontal line represents a RAR window, and a small block represents a detected RAR. Large blocks of the same shape represent that same beam is used to transmit the random access signals, and large blocks of different shapes represent that different beams are used to transmit the random access signals. Here, same shape refers to that lines of the large blocks are same, and different shapes refers to that lines of the large blocks are different.

It should be understood that the multiple methods for random access provided by embodiments of the present application described below may be configuration of the terminal device performed by the network device. For example, the network device may transmit indication information to the terminal device so as to indicate the terminal device to adopt the one or more random access methods as follows; one or more of the multiple methods for random access provided by embodiments of the present application described below may be specified in a protocol. Embodiments of the present application have no limits on this.

It should also be understood that the resources used in the multiple methods for random access provided by embodiments of the present application described below may be configured by the network device to the terminal device by using a downlink control message; or the protocol may specify that the terminal device make the random access on a specific resource. Embodiments of the present application have no limits on this.

The first method includes four steps as below:

Step 1: the terminal device repeatedly transmits random access signals on one beam (the large blocks consisting of vertical lines in FIG. 3 and FIG. 4) in multiple times, wherein the times of transmissions of the random access signals may be configured by the network, or may be a default value specified by a protocol, for example 1.

Step 2: the terminal device starts a RAR window at a certain moment (where the horizontal line starts) after repeatedly transmitting the random access signals on one beam in multiple times, and detects the RAR in the RAR window, wherein the random access signals transmitted in multiple times share one RAR window.

Step 3: the terminal device stops transmitting a random access signal if one or more RARs are detected in the RAR window by the terminal device; the terminal device needs to retransmit the random access signal if no RAR is detected in the RAR window by the terminal device. Specifically, the random access signal is retransmitted in Step 4.

Step 4: the terminal device may continue to transmit at least one random access signal on the beam on which the random access signals are transmitted in multiple times (the four large blocks in FIG. 4 use the same vertical line, representing that same beam is used for the random access signal transmitted previously and the random access signal transmitted later) in a manner of previously transmitting the random access signals in multiple times; or the terminal device continues to transmit the random access signals in multiple times on a new beam (the first two large blocks in FIG. 3 are different in the shape from the next two large blocks, which represent that different beams are used for the random access signal transmitted previously and the random access signal transmitted later). Certainly, retransmitting the random access signals in multiple times in FIG. 3 and FIG. 4 may also be reconfigured by the network device. That is, as long as the RAR is not detected by the terminal device in the RAR window, the network device may configure the manner of retransmitting the random access signal, for example, through broadcast, multicast or the like. Embodiments of the present application have no limits on this.

The second method includes four steps as below:

Step 1: the terminal device transmits a first random access signal, starts a RAR window at a certain moment after the random access signal is transmitted, and continues to transmit a random access signal until a RAR is received in a RAR window. Same beam can be used to continue to transmit the random access signal. As shown in FIG. 5, the block consisting of vertical lines, which is below the beginning of the horizontal line, indicates that the original beam is used to continue to transmit the random access signal, and the random access signals transmitted in multiple times by the terminal device share a common RAR window.

Step 2, the terminal device detects the RAR in the RAR window.

Step 3: if the RAR is detected by the terminal device in the RAR window, it indicates that the random access is successful; if the RAR is not detected by the terminal device in the RAR window, then the terminal device retransmits the random access signal to the network device, specifically in Step 4.

Step 4, the terminal device may continue to transmit at least one random access signal on a new beam (in FIG. 5, the shape of the last two large blocks is different from that of the first two large blocks, which indicates that a different beam is used to retransmit the random access signals), until the RAR is detected, which indicates that the random access is successful. The terminal device may also continue to transmit at least one random access signal on the beam on which the random access signals are previously transmitted in multiple times (the last two large blocks in FIG. 6 adopt the same shape as the first two large blocks, which indicates that the same beam is used to retransmit the random access signals), until the RAR is detected, which indicates that the random access is successful.

The third method includes four steps as below:

Step 1, the terminal device transmits random access signals in multiple times to the network device on different beams (the first two large blocks of different shapes in FIG. 11 represent two different beams). For example, if random access signals need to be transmitted in four times, and the terminal device has two available beams for transmitting random access signals, then the terminal device may use one to transmit random access signals for two times, and the other to transmit the random access signals for another two times; or the terminal device may use one to transmit the random access signals for one time, and the other to transmit the random access signals for other three times; if the terminal device has four available beams for transmitting the random access signals, then the terminal device may use each to transmit the random access signal for one time. Specifically, as to which beams can be used by the terminal device to transmit the random access signals in multiple times, the terminal device may determine beams for transmitting the random access signals according to a certain rule (for example, a pattern).

Step 2, after transmissions in multiple times of the random access signals on different beams are completed by the terminal device, the terminal device starts a RAR window at a specific time (i.e. the position where the horizontal line starts), and detects the RAR in the RAR window which is a common RAR shared by the foregoing random access signals transmitted in multiple times.

Step 3: the terminal device stops transmitting the random access signal if one or more RARs are detected in the RAR window by the terminal device; the terminal device needs to retransmit the random access signal, specifically in Step 4, if an RAR is not detected in the RAR window by the terminal device.

Step 4: the terminal device may continue to transmit at least one random access signal on the beam on which the random access signals are transmitted in multiple times (the first two large blocks with different shapes and the last two large blocks with different shapes in FIG. 7 represents that same beam is used for the random access signal transmitted previously and the random access signal transmitted later, that is, those beams used before retransmitting are also used for retransmitting), in a manner of previously transmitting the at least one random access signal in multiple times, until the RAR is detected which indicates that the random access is successful.

The fourth method includes four steps as below:

Step 1: the terminal device transmits the random access signal on a first beam (the first large block in FIG. 8) in the first time at first, starts a RAR window at a certain moment after the random access signal is transmitted, and continues to transmit a random access signal until a RAR is received in a RAR window. Same beam can be used to continue to transmit the random access signal. As shown in FIG. 8, the block consisting of oblique lines, which is below the beginning of the horizontal line, indicates that a new second beam is used to continue to transmit the random access signal. The random access signals transmitted by the terminal device on the first and second beams share a common RAR window.

Step 2, the terminal device detects the RAR in the RAR window.

Step 3: if the RAR is detected by the terminal device in the RAR window, it indicates that the random access is successful; if the RAR is not detected by the terminal device in the RAR window, then the terminal device retransmits the random access signal to the network device, specifically in Step 4.

Step 4: the terminal device may continue to transmit the random access signal at least once on the first and second beams (the last two large blocks of different shapes in FIG. 8 represent the first and second beams), until the RAR is detected which indicates that the random access is successful. The terminal device may also continue to transmit the random access signal at least once on a new beam, until the RAR is detected which indicates that the random access is successful.

The fifth method includes four steps as below:

Step 1: the terminal device transmits the random access signals in multiple times on one beam, and then continues to transmit the random access signals in multiple times on another beam or on the same beam, and repeats the above (as shown in FIG. 9), wherein the number of transmissions of the random access signals on each beam may be same or different. For example, the network device can configure the terminal device to transmit the random access signals for four times on each of three beams, and the total number of transmissions of the random access signals is 12. Or the network device may also configure the terminal device to transmit the random access signals for different times on different beams. For example, the random access signals are transmitted for 2 times on the first beam, 4 times on the second beam, and 6 times on the third beam. Embodiments of the present application have no limits on this.

Step 2: after all the random access signals are transmitted in Step 1, a RAR window is started at a specific time, which means that the random access signals transmitted in multiple times correspond to one RAR window, and the RAR is detected in the RAR window.

Step 3: If the RAR is detected in the RAR window, it indicates that the random access is successful; if the RAR is not detected in the RAR window, the random access signal needs to be retransmitted, specifically in Step 4.

Step 4, the random access signal may be retransmitted using the foregoing transmitting method. For example, the terminal device transmits the random access signals in multiple times on one beam, and then continues to transmit the random access signals multiple times on another beam, wherein the number of transmissions of the random access signals on each beam can be same or different. Or, the subsequent random access signal may be transmitted in a manner configured by the network and/or specified by the protocol, which is not limited by embodiments of the present application.

The sixth method includes four steps as below:

Step 1: the terminal device transmits the random access signals in multiple times on one beam, and then continues to transmit the random access signals in multiple times on another beam or on the same beam, and repeats the above (as shown in FIG. 10), wherein the number of transmissions of the random access signals on each beam may be same or different. For example, the network device can configure the terminal device to transmit the random access signals for four times on each of three beams, and the total number of transmissions of the random access signals is 12. Or the network device may also configure the terminal device to transmit the random access signals for different times on different beams. For example, the random access signals are transmitted for 2 times on the first beam, 4 times on the second beam, and 6 times on the third beam. Embodiments of the present application have no limits on this.

Step 2, after the first transmission of the random access signal on the first beam in Step 1 is completed by the terminal device, a RAR window is started at a specific time (the large block below the beginning of the horizontal line in FIG. 10 indicates continuing to transmit the random access signal), which means that the random access signals transmitted in multiple times correspond to one RAR window, and the RAR is detected in the RAR window. That is, the RAR window is started earlier, and is started at a specific time after the first transmission of the random access signal is completed. Here, the specific time after the first transmission of the random access signal is completed may be configured by the network or specified by the protocol.

Step 3: If the RAR is detected in the RAR window, it indicates that the random access is successful; if the RAR is not detected in the RAR window, the random access signal needs to be retransmitted, specifically in Step 4.

Step 4, the random access signal may be retransmitted using the foregoing transmitting method. For example, the terminal device transmits the random access signals in multiple times on one beam, and then continues to transmit the random access signals multiple times on another beam, wherein the number of transmissions of the random access signals on each beam can be same or different. Or, the subsequent random access signal may be transmitted in a manner configured by the network and/or specified by the protocol, which is not limited by embodiments of the present application.

That is to say, in the first to sixth methods, the transmissions in multiple times of the random access signals corresponding to one RAR window, wherein the RAR window is started either after all of the random access signals are transmitted in some of the methods, or after the first transmission of the random access signal is completed in others of the methods.

The seventh method includes four steps as below:

Step 1, the terminal device transmits random access signals in multiple times to the network device on different beams (the first two large blocks of different shapes in FIG. 11 represent two different beams). For example, if random access signals need to be transmitted in four times, and the terminal device has two available beams for transmitting random access signals, then the terminal device may use one to transmit random access signals for two times, and the other to transmit the random access signals for another two times; or the terminal device may use one to transmit the random access signals for one time, and the other to transmit the random access signals for other three times; if the terminal device has four available beams for transmitting the random access signals, then the terminal device may use each to transmit the random access signal for one time. Specifically, as to which beams can be used by the terminal device to transmit the random access signals in multiple times, the terminal device may determine beams for transmitting the random access signals according to a certain rule (for example, a pattern).

Step 2, each transmission of a random access signal by the terminal device corresponds to one RAR window. As shown in FIG. 11, the random access signals are transmitted in two times on two different beams, corresponding to two RAR windows. The RAR window corresponding to each transmission of the random access signal is started from the specific time after the transmission of the random access signal. The specific time here can be configured by the network and/or specified in the protocol. Optionally, multiple transmissions of the random access signals may correspond to at least one RAR window. For example, four transmissions of the random access signals correspond to three RAR windows. The specific corresponding relationship between the number of transmissions of the random access signals and the number of RAR windows may be configured by the network or specified by the protocol, which is not limited by embodiments of the present application.

Step 3: if the RAR is not detected in RAR windows of all of the random access signals, the random access signal needs to be retransmitted, specifically in Step 4.

Step 4, the terminal device may continue to transmit the random access signals in multiple times on the beam on which the random access signals are previously transmitted in multiple times (the two large blocks in latter part of FIG. 11 adopt different shapes, and the shapes of the first two large blocks are also different, representing that different beams are used to previously transmit the random access signals in multiple times, and these different beams used in previous transmissions are used later to retransmit the random access signals), until the RAR is detected which indicates that the random access is successful.

The eighth method includes four steps as below:

Step 1, the terminal device transmits random access signals to the network device in multiple times on a same beam (the first two large blocks of same shape in FIG. 12 represent two identical beams). For example, if two random access signals need to be transmitted, and the terminal device has one beam available for transmitting a random access signal, then the random access signals can be transmitted in two times in the beam.

Step 2, each transmission of a random access signal by the terminal device corresponds to one RAR window. As shown in FIG. 12, the random access signals are transmitted in two times on a same beam, corresponding to two RAR windows. The RAR window corresponding to each transmission of the random access signal is started from the specific time after the transmission of the random access signal. Optionally, multiple transmissions of the random access signals may correspond to at least one RAR window. For example, four transmissions of the random access signals correspond to three RAR windows. The specific corresponding relationship between the number of transmissions of the random access signals and the number of RAR windows may be configured by the network or specified by the protocol, which is not limited by embodiments of the present application.

Step 3: if the RAR is not detected in RAR windows of all of the random access signals, the random access signal needs to be retransmitted, specifically in Step 4.

Step 4: the terminal device may continue to transmit the random access signals in multiple times on the beam on which the random access signals are previously transmitted in multiple times (the last two large blocks in FIG. 12 adopt a different shape from that of the first two large blocks, which indicates that a different beam is used to transmit the random access signals than previously used), until the RAR is detected, which indicates that the random access is successful.

The ninth method includes four steps as below:

Step 1, the terminal device transmits random access signals in multiple times to the network device on different beams (the first two large blocks of different shapes in FIG. 13 represent two different beams). For example, if random access signals need to be transmitted in four times, and the terminal device has two available beams for transmitting random access signals, then the terminal device may use one to transmit random access signals for two times, and the other to transmit the random access signals for another two times; or the terminal device may use one to transmit the random access signals for one time, and the other to transmit the random access signals for other three times; if the terminal device has four available beams for transmitting the random access signals, then the terminal device may use each to transmit the random access signal for one time. Specifically, as to which beams can be used by the terminal device to transmit the random access signals in multiple times, the terminal device may determine beams for transmitting the random access signals according to a certain rule (for example, a pattern).

Step 2, each transmission of a random access signal by the terminal device corresponds to one RAR window. As shown in FIG. 13, the random access signals are transmitted in two times on two different beams, corresponding to two RAR windows. The RAR window corresponding to each transmission of the random access signal is started from the specific time after the transmission of the random access signal. Optionally, multiple transmissions of the random access signals may correspond to at least one RAR window. For example, four transmissions of the random access signals correspond to three RAR windows. The specific corresponding relationship between the number of transmissions of the random access signals and the number of RAR windows may be configured by the network or specified by the protocol, which is not limited by embodiments of the present application.

Step 3, if each transmission of the random access signal correspond to one RAR window, and when the RAR window of the first transmission of the random access signal which is transmitted on the first beam ends, the terminal device fails to receive the RAR transmitted by the network device, then the terminal device retransmits the random access signal on the beam on which the first transmission of the random access signal is performed, without waiting for endings of RAR windows of all the random access signals. For example, in FIG. 13, the RAR is not received before ending of the lower horizontal line, and the random access signal is retransmitted before the upper horizontal line ends. As such, the delay of random access of the terminal device can be reduced. Specifically, the retransmitting of the random access signal is performed in Step 4.

Step 4, the terminal device may continue to transmit the random access signals in multiple times on the beam on which the random access signals are previously transmitted in multiple times (the two large blocks in latter part of FIG. 13 adopt different shapes, and the shapes of the first two large blocks are also different, representing that different beams are used to previously transmit the random access signals in multiple times, and these different beams used in previous transmissions are used later to retransmit the random access signals), until the RAR is detected which indicates that the random access is successful.

The tenth method includes four steps as below:

Step 1, the terminal device transmits random access signals to the network device in multiple times on a same beam (the first two large blocks of same shape in FIG. 14 represent two identical beams). For example, if two random access signals need to be transmitted, and the terminal device has one beam available for transmitting a random access signal, then the random access signals can be transmitted in two times in the beam.

Step 2, each transmission of the random access signal by the terminal device corresponds to one RAR window. As shown in FIG. 14, two transmissions of the random access signals on the same beam correspond to two RAR windows. The RAR window of each transmission of the random access signal is started from a specific time after the transmission of the random access signal. Optionally, multiple transmissions of the random access signals may correspond to at least one RAR window. For example, four transmissions of the random access signals correspond to three RAR windows. The specific corresponding relationship between the number of transmissions of the random access signals and the number of RAR windows may be configured by the network or specified by the protocol, which is not limited by embodiments of the present application.

Step 3, if each transmission of the random access signal correspond to one RAR window, and when the RAR window of the first transmission of the random access signal ends, the terminal device fails to receive the RAR transmitted by the network device, then the terminal device retransmits the random access signal, without waiting for endings of RAR windows of all the random access signals. For example, in FIG. 14, the RAR is not received before ending of the lower horizontal line, and the random access signal is retransmitted before the upper horizontal line ends. As such, the delay of random access of the terminal device can be reduced. Specifically, the retransmitting of the random access signal is performed in Step 4.

Step 4: the terminal device may continue to transmit the random access signals in at least one time on a new beam (the last two large blocks in FIG. 14 adopt a different shape from that of the first two large blocks, which indicates that a different beam is used to transmit the random access signals than previously used), until the RAR is detected, which indicates that the random access is successful.

The eleventh method includes four steps as below:

Step 1: the terminal device transmits the random access signals in multiple times on one beam, and then continues to transmit the random access signals in multiple times on another beam or on the same beam, and repeats the above (as shown in FIG. 15), wherein the number of transmissions of the random access signals on each beam may be same or different. For example, the network device can configure the terminal device to transmit the random access signals for four times on each of three beams, and the total number of transmissions of the random access signals is 12. Or the network device may also configure the terminal device to transmit the random access signals for different times on different beams. For example, the random access signals are transmitted for 2 times on the first beam, 4 times on the second beam, and 6 times on the third beam. Embodiments of the present application have no limits on this.

Step 2, if each transmission of the random access signal correspond to one RAR window, and multiple transmissions of random access signals are performed on each beam, then each beam corresponds to a plurality of RAR windows, so that multiple beams correspond to a plurality of RAR windows; or all transmissions of random access signals on each beam correspond to one RAR window, so that the multiple beams correspond to the plurality of RAR windows. For example, if there are three beams, four transmissions of random access signals are performed on each beam, and each beam corresponds to one RAR window, then there may be three RAR windows; or each transmission of the random access signal corresponds to one RAR window, then there may be 12 windows. The terminal device detects the RAR in multiple RAR windows.

Step 3, as long as one RAR is detected in the plurality of RAR windows, it is considered that the random access is successful; if the RAR is not detected in the plurality of RAR windows, the random access signal needs to be retransmitted by the terminal device, specifically in Step 4.

Step 4, the random access signal may be retransmitted using the foregoing transmitting method. For example, the terminal device transmits the random access signals in multiple times on one beam, and then continues to transmit the random access signals multiple times on another beam, wherein the number of transmissions of the random access signals on each beam can be same or different. Or, the subsequent random access signal may be transmitted in a manner configured by the network and/or specified by the protocol, which is not limited by embodiments of the present application.

The twelfth method includes four steps as below:

Step 1: the terminal device transmits the random access signals in multiple times on one beam, and then continues to transmit the random access signals in multiple times on another beam or on the same beam, and repeats the above (as shown in FIG. 16), wherein the number of transmissions of the random access signals on each beam may be same or different. For example, the network device can configure the terminal device to transmit the random access signals for four times on each of three beams, and the total number of transmissions of the random access signals is 12. Or the network device may also configure the terminal device to transmit the random access signals for different times on different beams. For example, the random access signals are transmitted for 2 times on the first beam, 4 times on the second beam, and 6 times on the third beam. Embodiments of the present application have no limits on this.

Step 2, if each transmission of the random access signal correspond to one RAR window, and multiple transmissions of random access signals are performed on each beam, then each beam corresponds to a plurality of RAR windows, so that multiple beams correspond to a plurality of RAR windows; or all transmissions of random access signals on each beam correspond to one RAR window, so that the multiple beams correspond to the plurality of RAR windows. For example, if there are three beams, four transmissions of random access signals are performed on each beam, and each beam corresponds to one RAR window, then there may be three RAR windows; or each transmission of the random access signal corresponds to one RAR window, then there may be 12 windows. The terminal device detects the RAR in multiple RAR windows.

Step 3, if each transmission of the random access signal correspond to one RAR window, and when the RAR window of the first transmission of the random access signal ends, the terminal device fails to receive the RAR transmitted by the network device, then the terminal device retransmits the random access signal, without waiting for endings of RAR windows of all the random access signals. For example, in FIG. 16, the RAR is not received before ending of the lowest horizontal line, and the random access signal is retransmitted before the upper horizontal line ends. As such, the delay of random access of the terminal device can be reduced. Specifically, the retransmitting of the random access signal is performed in Step 4.

Step 4: the terminal device may continue to transmit the random access signals in at least one time on the beam on which the random access signals are previously transmitted in multiple times (in FIG. 16, the shape of the latter beam pair is identical to that of the previous beam pair, which indicates that the later transmissions in multiple times of the random access signals use the same beam previously used), until the RAR is detected, which indicates that the random access is successful.

That is to say, from the seventh to twelfth method, each transmission of the random access signal corresponds to one RAR window, so that multiple transmissions of the random access signals correspond to a plurality of RAR windows. If a RAR is not detected in one of the plurality of RAR windows, then the random access signal needs to be retransmitted. Some methods can detect whether a RAR is received or not in the plurality of RAR windows, and some methods can detect whether RAR is received or not in a RAR window which is started earliest.

Figure 17:
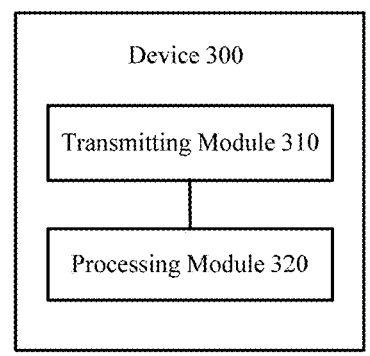
FIG. 17 is a schematic block diagram of a device for random access according to an embodiment of the present application.

FIG. 17 is a schematic block diagram of a device 300 for random access according to an embodiment of the present application, wherein the device can be the terminal device in the method 100. As shown in FIG. 17, the device 300 includes: a transmitting module 310 and a processing module 320; wherein, the transmitting module 310 is configured to transmit at least one random access signal to a network device;

the processing module 320 is configured to detect a random access response transmitted by the network device in a random access response window corresponding to continuous transmissions in multiple times of random access signals, wherein the continuous transmissions in multiple times of the random access signals comprise continuous transmission of the at least one random access signal;

The transmitting module 310 is further configured to continue to transmit a subsequent random access signal to the network device, if the random access response transmitted by the network device is not detected at the end of the plurality of random access response windows.

As an alternative embodiment, transmission of the at least one random access signal comprises transmissions in multiple times of the random access signals, and the processing module 320 is specifically configured to: start the random access response window and detect the random access response transmitted by the network device in the random access response window, if the continuous transmissions in multiple times of the random access signals are completed by the transmitting module 310.

As an alternative embodiment, the processing module 320 is specifically configured to: start the random access response window and detect the random access response transmitted by the network device in the random access response window, if transmission of a first random access signal of the at least one random access signal is completed by the transmitting module 310.

As an alternative embodiment, the transmitting module 310 is specifically configured to: continue to transmit the subsequent random access signal to the network device on a beam on which the at least one random access signal is transmitted; or, continue to transmit the subsequent random access signal to the network device on a beam other than that beam on which the at least one random access signal is transmitted.

As an alternative embodiment, the transmitting module 310 is further configured to: continuously transmit the at least one random access signal to the network device on a same beam; or, continuously transmit the at least one random access signal to the network device on different beams.

As an alternative embodiment, the transmitting module 310 is specifically further configured to: transmit a first part of random access signals of the at least one random access signal to the network device on a first beam; transmit a second part of random access signals of the at least one random access signal to the network device on a second beam, wherein the first beam is different from the second beam.

As an alternative embodiment, the processing module 320 is further configured to: stop transmitting the subsequent random access signal to the network device if the random access response transmitted by the network device is detected in the random access response window.

As an alternative embodiment, the processing module 320 is further configured to: stop transmit a random access signal, which is not transmitted, of the random access signals which should be transmitted in multiple times and the subsequent random access signal to the network device when the random access response transmitted by the network device is detected before ending of the random access response window.

Figure 18:
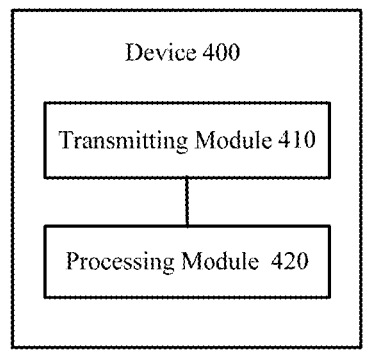
FIG. 18 is a schematic block diagram of a device for random access according to another embodiment of the present application.

FIG. 18 is a schematic block diagram of a device 400 for random access according to an embodiment of the present application, wherein the device can be the terminal device in the method 200. As shown in FIG. 18, the device 400 includes: a transmitting module 410 and a processing module 420; wherein, the transiting module 410 is configured to continuously transmit random access signals to a network device in multiple times;

the processing module 420 is configured to detect a random access response transmitted by the network device in a plurality of random access response windows corresponding to continuous transmissions in multiple times of the random access signals, wherein one transmission of that of the random access signals transmitted in multiple times is corresponding to one of the plurality of random access response windows;

the transmitting module 410 is further configured to: continue to transmit a subsequent random access signal to the network device if the random access response transmitted by the network device is not detected in the plurality of random access response windows.

As an alternative embodiment, the processing module 420 is specifically configured to: start a random access response window corresponding to each of transmissions of the random access signals when the each transmission is completed by the transmitting module, and detect the random access response transmitted by the network device in the plurality of random access response windows.

As an alternative embodiment, the transmitting module 410 is specifically configured to: continue to transmit the subsequent random access signal to the network device on a beam on which the random access signals are transmitted; or, continue to transmit the subsequent random access signal to the network device on a beam other than that beam on which the random access signals are transmitted.

As an alternative embodiment, the transmitting module 410 is specifically further configured to: continuously transmit the random access signals to the network device on a same beam; or, continuously transmit the random access signals to the network device on different beams.

As an alternative embodiment, the transmitting module 410 is specifically further configured to: continuously transmit a first part of random access signals of the random access signals to the network device on a first beam; continuously transmit a second part of random access signals of the random access signals to the network device on a second beam, wherein the first beam is different from the second beam.

As an alternative embodiment, the processing module 420 is further configured to: stop transmitting the subsequent random access signal to the network device if the random access response transmitted by the network device is not detected before ending of each of the plurality of random access response windows.

As an alternative embodiment, the processing module 420 is specifically further configured to: continue to transmit the subsequent random access signal to the network device if the random access response transmitted by the network device is not detected before ending of any one of the plurality of random access response windows.

As an alternative embodiment, the processing module 420 is further configured to: stop transmitting the subsequent random access signal to the network device if the random access response transmitted by the network device is detected in the plurality of random access response windows.

As an alternative embodiment, the processing module 420 is specifically configured to: stop transmitting a random access signal, which is not transmitted, of the random access signals which should be transmitted in multiple times and the subsequent random access signal to the network device when the random access response transmitted by the network device is detected in any one of the plurality of random access response windows.

Figure 19:
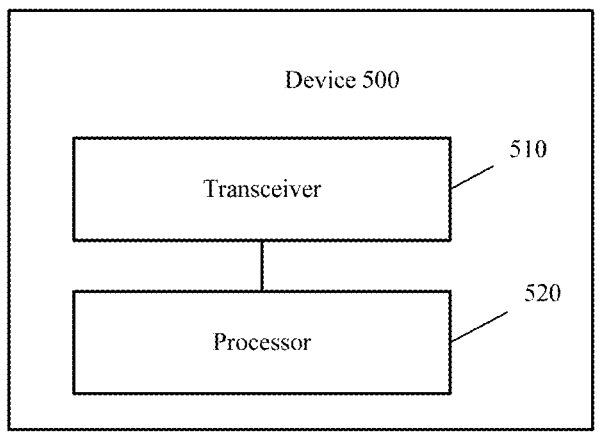
FIG. 19 is a schematic block diagram of a device for random access according to another embodiment of the present application.

FIG. 19 is a schematic block diagram of a device 500 for random access according to an embodiment of the present application, for example, the device can be the terminal device in the method 100. As shown in FIG. 19, the terminal device 500 includes a transceiver 510 and a processor 520.

Wherein the transceiver 510 is configured to transmit at least one random access signal to a network device; the processor 520 is configured to: detect a random access response transmitted by the network device in a random access response window corresponding to continuous transmissions in multiple times of random access signals, wherein the continuous transmissions in multiple times of the random access signals comprise continuous transmission of the at least one random access signal; The transceiver 510 is further configured to: continue to transmit a subsequent random access signal to the network device, if the random access response transmitted by the network device is not detected at the end of the plurality of random access response windows.

It should be understood that the device 500 can be corresponding to that terminal device in the method 100 and can implement corresponding functions of that terminal device in the method 100, which are omitted herein for the sake of brevity.

Figure 20:
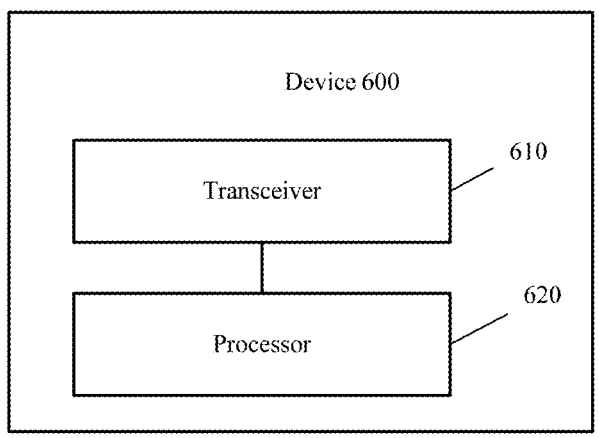
FIG. 20 is a schematic block diagram of a device for random access according to another embodiment of the present application.

FIG. 20 is a schematic block diagram of a random access device 600 according to an embodiment of the present application, the device can be the terminal device in the method 200. As shown in FIG. 20, the network device 600 includes a transceiver 610 and a processor 620.

The transceiver 610 is configured to continuously transmit random access signals to a network device in multiple times; the processor 620 is configured to: detect a random access response transmitted by the network device in a plurality of random access response windows corresponding to continuous transmissions in multiple times of the random access signals, wherein one transmission of that of the random access signals transmitted in multiple times is corresponding to one of the plurality of random access response windows; the transceiver 610 is further configured to: continue to transmit a subsequent random access signal to the network device if the random access response transmitted by the network device is not detected in the plurality of random access response windows.

It should be understood that the device 600 can be corresponding to that terminal device in the method 200 and can implement corresponding functions of that terminal device in the method 200, which are omitted herein for the sake of brevity.

It should be understood that, in embodiments of the present application, the processor 320 may be a central processing unit (CPU), and the processor may also be a general-purpose processor, a digital signal processor (DSP), an application specific integrated circuit (ASIC), a field programmable gate array (FPGA) or other programmable logic device, discrete gate or transistor logic device, discrete hardware components, etc. The general-purpose processor may be a microprocessor, or the processor may be any conventional processor or the like.

It should be understood that, the term "and/or" herein only describes an association relationship between associated objects and indicates that there may be three relationships. For example, A and/or B may indicate that there are three cases where A exists separately, A and B exist at the same time, and B exists separately. In addition, the character "/" herein generally indicates that an "or" relationship exists between associated objects.

It should be understood that, in various embodiments of the present application, the values of the sequence numbers of the above processes do not mean the order of execution, and the order of execution of each process should be determined by its function and internal logic, and should not be considered as any limitation to embodiments of the present application.

It may be appreciated by an ordinary person skilled in the art that various units and algorithm steps of various examples described in conjunction with the embodiments disclosed herein may be implemented in electronic hardware, or a combination of electronic hardware and computer software.

Whether these functions are implemented in hardware or software depends on specific applications and design constraints of technical solutions. A person skilled in the art may implement the described functions with different methods for each of specific applications, but such implementations shall not be regarded as going beyond the scope of the present application.

A person skilled in the art may clearly understand that for the sake of convenience and conciseness in description, corresponding processes in the forgoing method embodiments can be referenced for the specific work processes of the systems, devices and units described in the above, which are not further described herein.

In several embodiments provided by the present application, it should be understood that the disclosed systems, devices and methods may be implemented by other means. For example, the device embodiments described above are merely schematic. For example, the partitioning of the units may be a partitioning in logical functions. There may be other manners for partitioning in actual implementation. For example, multiple units or components may be combined together or integrated into another system, or some features can be omitted or not executed. In addition, mutual couplings or direct couplings or communication connections that are shown or discussed may be indirect couplings or communication connections through some interfaces, devices or units, and may be in electrical, mechanical or other forms.

The units described as separated components may be or may not be physically separated. The components shown as units may be or may not be physical units, that is, they may be located in one place or may be distributed on a plurality of network units. Part or all of the units may be selected according to actual needs to achieve the purposes of the solutions of the embodiments of the present application.

In addition, all functional units in the embodiments of the present application may be integrated into one processing unit. Or, each unit exists independently in physics. Or, two or more units may be integrated into one unit.

The functional units, if implemented in the form of the software functional unit and sold or used as a standalone product, may be stored in a computer-readable storage medium. Based on such an understanding, the technical solution of the present application in essence, or the part that contributes to the prior art, or the part of the technical solution, may be embodied in the form of a software product. The computer software product is stored in a storage medium and includes a plurality of instructions for a computer device (which may be a personal computer, a server, a network device or the like) to execute all or part of the steps of the method described in the embodiments of the present application. The foregoing storage medium includes various media that may store program codes, such as a USB flash disk, a mobile hard disk, a read-only memory (ROM), a random access memory (RAM), a magnetic disk, an optical disk, or the like.

The above description is merely a specific implementation mode of the present application, but the scope of protection of the present application is not limited to this. Any modification or replacement that would be readily conceived by any person skilled in the art within the scope of the technology disclosed in the present application should be within the scope of protection of the present application. Therefore, the scope of protection of the present application shall be defined by the claims.

What is claimed is:

1. A method for random access, comprising:
continuously transmitting, by a terminal device, at least one random access signal to a network device;
detecting, by the terminal device, a random access response transmitted by the network device in a random access response window corresponding to continuous transmissions in multiple times of random access signals, wherein the continuous transmissions in multiple times of the random access signals comprise continuous transmission of the at least one random access signal;
continuing to transmit, by the terminal device, a subsequent random access signal to the network device when the terminal device fails to detect the random access response transmitted by the network device before ending of the random access response window; and
stopping transmitting, by the terminal device, a random access signal, which is not transmitted, of the random access signals which should be transmitted in multiple times and the subsequent random access signal to the network device when the random access response transmitted by the network device is detected by the terminal device before ending of the random access response window.

2. The method of claim 1, wherein transmission of the at least one random access signal comprises transmissions in multiple times of the random access signals; and
wherein detecting, by the terminal device, a random access response transmitted by the network device in a random access response window corresponding to continuous transmissions in multiple times of random access signals comprises:
starting, by the terminal device, the random access response window and detecting, by the terminal device, the random access response transmitted by the network device in the random access response window, when the continuous transmissions in multiple times of the random access signals are completed by the terminal device.

3. The method of claim 1, wherein detecting, by the terminal device, a random access response transmitted by the network device in a random access response window corresponding to continuous transmissions in multiple times of random access signals comprises:
starting, by the terminal device, the random access response window and detecting, by the terminal device, the random access response transmitted by the network device in the random access response window, when transmission of a first random access signal of the at least one random access signal is completed by the terminal device.

4. The method of claim 1, wherein continuing to transmit, by the terminal device, a subsequent random access signal to the network device comprises:
continuing to transmit, by the terminal device, the subsequent random access signal to the network device on a beam on which the at least one random access signal is transmitted.

5. The method of claim 1, wherein continuing to transmit, by the terminal device, a subsequent random access signal to the network device comprises:
continuing to transmit, by the terminal device, the subsequent random access signal to the network device on a beam other than that on which the at least one random access signal is transmitted.

6. A method for random access, comprising:
continuously transmitting, by a terminal device, random access signals to a network device in multiple times;
detecting, by the terminal device, a random access response transmitted by the network device in a plurality of random access response windows corresponding to continuous transmissions in multiple times of the random access signals, wherein one transmission of that of the random access signals transmitted in multiple times is corresponding to one of the plurality of random access response windows;
continuing to transmit, by the terminal device, a subsequent random access signal to the network device when the terminal device fails to detect the random access response transmitted by the network device within the plurality of random access response windows; and
stopping transmitting, by the terminal device, the subsequent random access signal to the network device in the plurality of random access response windows when the random access response transmitted by the network device is detected in any one of the plurality of random access response windows by the terminal device.

7. The method of claim 6, wherein detecting, by the terminal device, a random access response transmitted by the network device in a plurality of random access response windows corresponding to continuous transmissions in multiple times of random access signals comprises:
starting, by the terminal device, a random access response window corresponding to each of transmissions of the random access signals when the each transmission is completed by the terminal device, and detecting, by the terminal device, the random access response transmitted by the network device in the plurality of random access response windows.

8. The method of claim 6, wherein continuing to transmit, by the terminal device, a subsequent random access signal to the network device comprises:
continuing to transmit, by the terminal device, the subsequent random access signal to the network device on a beam on which the random access signals are transmitted.

9. The method of claim 6, wherein continuing to transmit, by the terminal device, a subsequent random access signal to the network device when the terminal device fails to detect the random access response transmitted by the network device within the plurality of random access response windows comprises:
continuing to transmit, by the terminal device, the subsequent random access signal to the network device when the terminal device fails to detect the random access response transmitted by the network device before ending of each of the plurality of random access response windows.

10. The method of claim 6, wherein continuing to transmit, by the terminal device, a subsequent random access signal to the network device when the terminal device fails to detect the random access response transmitted by the network device within the plurality of random access response windows comprises:

continuing to transmit, by the terminal device, the subsequent random access signal to the network device when the terminal device fails to detect the random access response transmitted by the network device before ending of any one of the plurality of random access response windows.

11. The method of claim 6, wherein continuing to transmit, by the terminal device, a subsequent random access signal to the network device comprises:
continuing to transmit, by the terminal device, the subsequent random access signal to the network device on a beam other than that on which the random access signals are transmitted.

12. A terminal device comprising:
a transceiver configured to:
transmit at least one random access signal to a network device;
a processor configured to:
detect a random access response transmitted by the network device in a random access response window corresponding to continuous transmissions in multiple times of random access signals, wherein the continuous transmissions in multiple times of the random access signals comprise continuous transmission of the at least one random access signal;
wherein the transceiver is further configured to: continue to transmit a subsequent random access signal to the network device, when the random access response transmitted by the network device is not detected at an end of the random access response windows; and stop transmit a random access signal, which is not transmitted, of the random access signals which should be transmitted in multiple times and the subsequent random access signal to the network device when the random access response transmitted by the network device is detected by the terminal device before ending of the random access response window.

13. The terminal device of claim 12, wherein the processor is configured to:
start the random access response window and detect the random access response transmitted by the network device in the random access response window, when the continuous transmissions in multiple times of the random access signals are completed by the terminal device.

14. The terminal device of claim 12, wherein the processor is configured to:
start the random access response window and detect the random access response transmitted by the network device in the random access response window, when transmission of a first random access signal of the at least one random access signal is completed by the terminal device.

15. The terminal device of claim 12, wherein the transceiver is configured to:
continue to transmit the subsequent random access signal to the network device on a beam on which the at least one random access signal is transmitted.

16. The terminal device of claim 12, wherein the transceiver is configured to:
continue to transmit the subsequent random access signal to the network device on a beam other than that on which the at least one random access signal is transmitted.

* * * * *